(12) United States Patent
Dillon et al.

(10) Patent No.: US 7,918,093 B2
(45) Date of Patent: Apr. 5, 2011

(54) MOBILE UNIT FOR CRYOGENIC TREATMENT

(75) Inventors: David Dillon, Ontario (CA); Robert MacInnis, Ontario (CA)

(73) Assignee: Dura 21, Inc., Ontario (CA)

( * ) Notice: Subject to any disclaimer, the term of this patent is extended or adjusted under 35 U.S.C. 154(b) by 519 days.

(21) Appl. No.: 12/072,337

(22) Filed: Feb. 25, 2008

(65) Prior Publication Data

US 2009/0211261 A1 Aug. 27, 2009

(51) Int. Cl.
*F25D 17/02* (2006.01)

(52) U.S. Cl. .............................. 62/64; 62/378

(58) Field of Classification Search ............. 62/64, 45.1, 62/50.1, 52.1, 53.2, 378, 384, 239, 434; 165/104.21
See application file for complete search history.

(56) References Cited

U.S. PATENT DOCUMENTS

| | | | |
|---|---|---|---|
| 3,385,073 A | 5/1968 | Snelling | |
| 3,638,450 A | 2/1972 | Falk | |
| 3,911,772 A * | 10/1975 | Kisielewski | 83/278 |
| 4,434,623 A * | 3/1984 | Weasel, Jr. | 62/64 |
| 4,498,306 A | 2/1985 | Tyree, Jr. | |
| 4,576,010 A | 3/1986 | Windecker | |
| 4,936,100 A | 6/1990 | Leppa | |
| 4,991,402 A * | 2/1991 | Saia, III | 62/52.1 |
| 5,199,275 A | 4/1993 | Martin | |
| 5,507,122 A | 4/1996 | Aulson | |
| 5,561,986 A | 10/1996 | Goodall | |
| 5,613,368 A * | 3/1997 | Marohl et al. | 62/84 |
| 5,660,057 A * | 8/1997 | Tyree, Jr. | 62/384 |
| 5,694,776 A | 12/1997 | Sahm | |
| 6,202,434 B1 | 3/2001 | Hearne, Jr. | |
| 6,895,764 B2 | 5/2005 | Viegas et al. | |
| 6,910,510 B2 | 6/2005 | Gale et al. | |
| 7,059,819 B2 * | 6/2006 | Brackmann et al. | 414/462 |
| 7,614,242 B1 * | 11/2009 | Quesada Saborio | 62/77 |
| 2006/0130925 A1 | 6/2006 | Bourgeois et al. | |
| 2006/0185371 A1 | 8/2006 | Trowell et al. | |

FOREIGN PATENT DOCUMENTS

| | | |
|---|---|---|
| EP | 0075 913 | 4/1983 |
| FR | 2 843 298 | 2/2004 |

* cited by examiner

*Primary Examiner* — Mohammad M Ali

(74) *Attorney, Agent, or Firm* — Carr & Ferrell LLP

(57) ABSTRACT

According to various embodiments, a portable cryogenic treatment system comprises a transportable housing. The transportable housing comprises a plurality of side walls, a front wall, a rear wall, a ceiling and a floor. The transportable housing includes a cryogenic liquid source and a cryogenic treatment chamber in fluid communication with the cryogenic liquid source. The cryogenic treatment chamber is configured to treat a treat able object using a cryogenic liquid.

19 Claims, 6 Drawing Sheets

MOBILE UNIT FOR CRYOGENIC TREATMENT

BACKGROUND

1. Field of Invention

The present application relates generally to cryogenic treatment and more specifically to a mobile unit for the same.

2. Description of Related Art

Various metals, alloys, ceramics, and plastics can be improved using cryogenic treatment in which an object is cooled to at least −180° C. The cryogenic treatment includes placing the object into a cryogenic treatment chamber and delivering a cryogenic liquid to the cryogenic treatment chamber. The cryogenic liquid may be liquid nitrogen, liquid helium, liquid hydrogen, or another liquefied gas. By controlling the rate at which cryogenic liquid is delivered, the temperature of the cryogenic treatment chamber is regulated. To increase the effectiveness of the cryogenic treatment for various materials, objects made of various materials may be subject to various temperatures over different lengths of time according to known treatment plans.

Further, some materials, after being cryogenically treated, may be tempered to further strengthen the treated object. In tempering, the object is heated to reduce the brittleness of the object.

SUMMARY OF THE INVENTION

According to various embodiments, a portable cryogenic treatment system comprises a transportable housing. The transportable housing comprises a plurality of side walls, a front wall, a rear wall, a ceiling and a floor. The transportable housing includes a cryogenic liquid source and a cryogenic treatment chamber in fluid communication with the cryogenic liquid source. The cryogenic treatment chamber is configured to treat a treatable object using a cryogenic liquid.

According to various embodiments, a portable cryogenic treatment system comprises a transportable housing. The transportable housing comprises a plurality of side walls, a front wall, a rear wall, a ceiling and a floor. The transportable housing includes a cryogenic liquid inlet configured to be connected to a cryogenic liquid source disposed external to the transportable housing and a cryogenic treatment chamber in fluid communication with the cryogenic liquid source. The cryogenic treatment chamber is configured to treat a treatable object using a cryogenic liquid.

According to various embodiments, a transportable housing comprises means for treating a treatable object with a cryogenic liquid, means for conveying the object to the means for treating the object, and means for transporting the means for treating the object and the means for conveying the object.

According to various embodiments, a method comprises transporting a mobile cryogenic unit to a first location. The mobile cryogenic unit comprises a cryogenic treatment chamber. A first object is treated in the cryogenic treatment chamber with a cryogenic liquid at the first location. The mobile cryogenic unit is transported to a second location. A second object is treated in the cryogenic treatment chamber with the cryogenic liquid at the second location.

DETAILED DESCRIPTION

A portable cryogenic treatment system is provided. The portable cryogenic treatment system allows a treatable object to be cryogenically treated without the delays and costs associated with packaging and transporting the treatable object to a remote cryogenic treatment facility. The portable cryogenic treatment system can be placed where needed such as near or within a warehouse, a manufacturing facility, an assembly plant, an industrial complex, a mining facility, or the like. The portable cryogenic treatment system can include, for example, a straight truck, a detachable trailer, a shipping container, or a boxcar. The portable cryogenic treatment system includes a cryogenic treatment chamber in which one or more treatable objects may undergo cryogenic treatment. Treatable objects are objects that can be cryogenically treated to improve strength, durability, crystal alignment, or another property. As will be apparent to one skilled in the art, treatable objects include objects made of metals, alloys, ceramics, plastics, or a combination thereof.

Figure 1A:
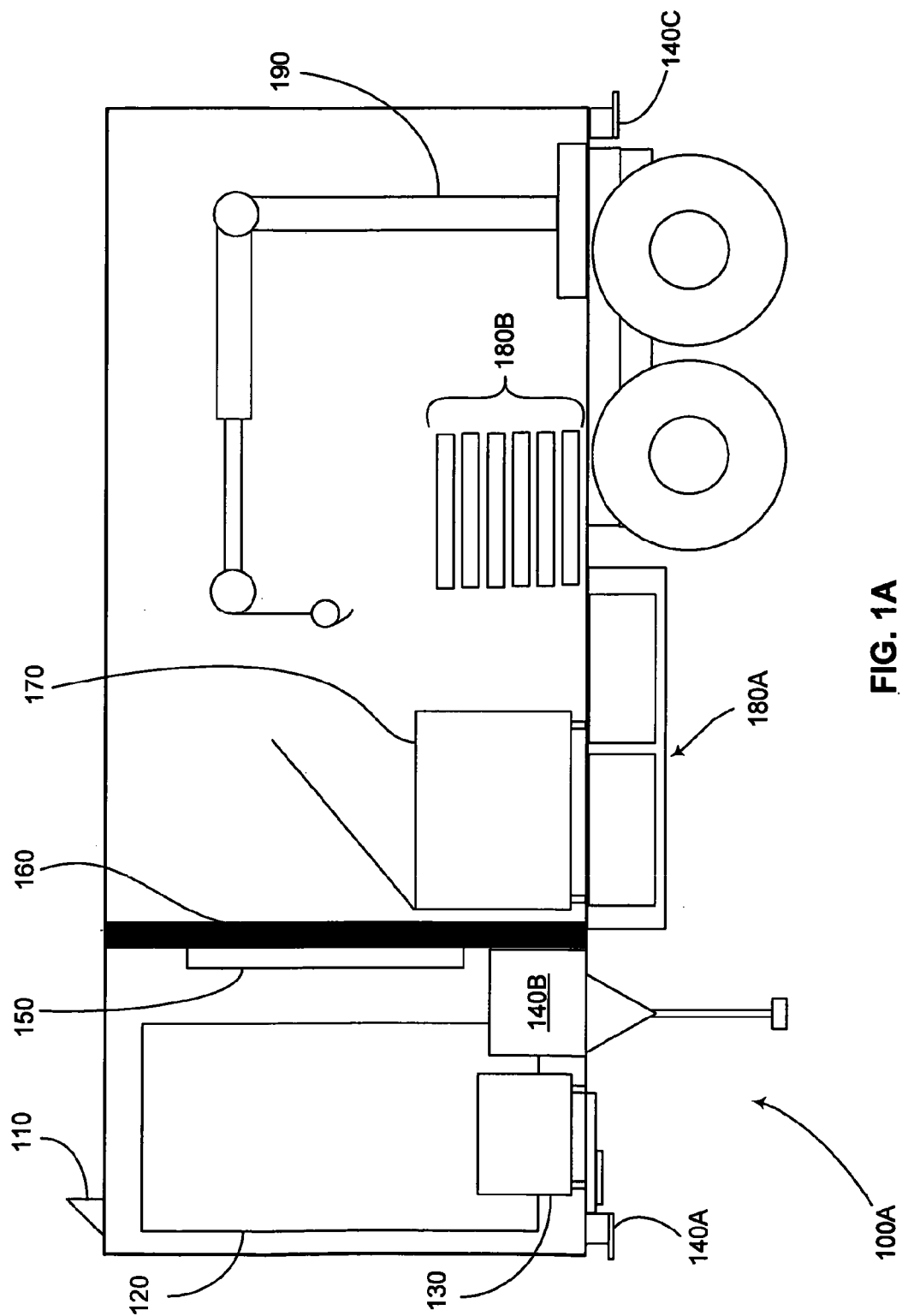
FIG. 1A depicts a cross-sectional view of a mobile unit for cryogenic treatment according to various embodiments.

FIG. 1A depicts a cross-sectional view of a mobile unit 100A for cryogenic treatment according to various embodiments. The mobile unit 100A is an exemplary embodiment of the portable cryogenic treatment system. The mobile unit 100A comprises ventilation 110, a cryogenic liquid source 120, an optional generator 130, a stabilization system 140A-140C, a control panel 150, a barrier 160, a cryogenic treatment chamber 170, storage racks 180A and 180B, and a telescopic crane 190. The mobile unit 100A includes a transportable housing depicted as a detachable tractor-trailer. The transportable housing comprises a plurality of side walls, a front wall, a rear wall, a ceiling and a floor. As will be apparent to those skilled in the art, the transportable housing may comprise a fifth wheel, a straight truck, shipping container, boxcar, or the like. The optional stabilization system 140A-140C is used to provide stability to the mobile unit 100A particularly while the mobile unit 100A is in transit.

The ventilation 110 is used to release excess gas resulting from evaporation of the cryogenic liquid. The ventilation 100 is capable of withstanding freezing temperatures due to the cold temperature of the cryogenic fluid and/or the released gas. The ventilation 110 may include a monitoring system which is configured to provide a warning if the air in the mobile unit 100A reaches an unsafe nitrogen level.

The cryogenic liquid source 120 is configured to store a cryogenic liquid such as liquid nitrogen, liquid helium, or liquid hydrogen. The cryogenic liquid source 120 typically comprises a pressurized tank or vacuum flask containing the cryogenic liquid. In some embodiments, the cryogenic liquid source 120 may be permanently or semi-permanently fixed within the mobile unit 100A. In these embodiments, the cryogenic liquid source 120 can be filled while mounted in the mobile unit 100A.

In other embodiments, the cryogenic liquid source 120 is removable from the mobile unit 100A. In these embodiments, to obtain additional cryogenic liquid, an empty or partially empty cryogenic liquid source 120 is removed and a full cryogenic liquid source 120 is loaded into the mobile unit 100A. By removing the cryogenic liquid source 120, transportation, fuel, license costs associated with transporting the cryogenic liquid within the mobile unit 100A may be reduced. In alternative embodiments, the cryogenic liquid source 120 may be replaced or supplemented by an inlet connecting the cryogenic treatment chamber 170 to a cryogenic liquid source disposed external to the transportable housing.

A cryogenic liquid generator, such as a liquid nitrogen generator, may be used to produce cryogenic liquid in, for example, remote locations. The liquid nitrogen generator may be in fluid communication with the cryogenic liquid source 120. In some embodiments, the cryogenic liquid generator may be in fluid communication with the cryogenic treatment chamber 170.

The optional generator 130 is configured to provide electrical power to the mobile unit 100A. The generator 130 may comprise a diesel generator, for instance. In some embodiments, the mobile unit 100A may be configured to receive power from an existing electrical power line.

The control panel 150 is configured to regulate delivery of the cryogenic liquid to the cryogenic treatment chamber 170 from the cryogenic liquid source 120. The control panel 150, as is known to those skilled in the art, may be computerized. In some embodiments, the control panel 150 is remotely controlled. The control panel 150 may allow a user to select a predefined cryogenic treatment procedure based on the materials being treated. Various cryogenic treatment procedures indicating temperatures and treatment times are known to those skilled in the art.

The barrier 160 separates the cryogenic liquid source 120, the generator 130, and the control panel 150 from the cryogenic treatment chamber 170. The barrier 160 provides additional protection and security between the cryogenic liquid source 120 and the cryogenic treatment chamber 170.

The cryogenic treatment chamber 170 is in fluid communication with the cryogenic liquid source 120. The cryogenic treatment chamber 170 is configured to treat a treatable object using the cryogenic liquid stored in the cryogenic liquid source 120. In exemplary embodiments, the internal size of the cryogenic treatment chamber 170 can be as small as 12"×12"×12" or as large as 96"×96"×600". The cryogenic treatment chamber 170 can be constructed using stainless steel or other materials as will be apparent to those skilled in the art.

In some embodiments, the cryogenic treatment chamber 170 may additionally include a heating element (not shown). The heating element may operate to heat the cryogenic treatment chamber 170 in order to temper cryogenically-treated treatable objects, to improve fracture toughness, for example.

The cryogenic liquid is delivered to the cryogenic treatment chamber 170 in the liquid phase from the cryogenic liquid source 120. The cryogenic treatment chamber 170 may include an atomizer, such as a Venturi tube, to produce a mist in the cryogenic treatment chamber 170. During treatment, the cryogenic liquid then collects on the bottom of the cryogenic treatment chamber 170. To remove excess cryogenic liquid, a drain may be installed on the bottom of the cryogenic treatment chamber 170.

The mobile unit 100A includes optional storage racks 180A and 180B. The storage rack 180A is external to the interior of the mobile unit 100A while the storage rack 180B is in the interior of the mobile unit 100A. Both the storage rack 180A and the storage rack 180B may be adjustable to accommodate the size of the treatable objects to be treated in the cryogenic treatment chamber 170.

The telescopic crane 190 is configured to transport treatable objects into and out of the cryogenic treatment chamber 170. The telescopic crane 190 may be remote-controlled by an operator. In some embodiments, the telescopic crane 190 may be replaced or supplemented by other means for conveying the treatable object such as a conveyor belt, a pulley, a ramp, or the like as will be apparent to those skilled in the art.

Figure 1B:
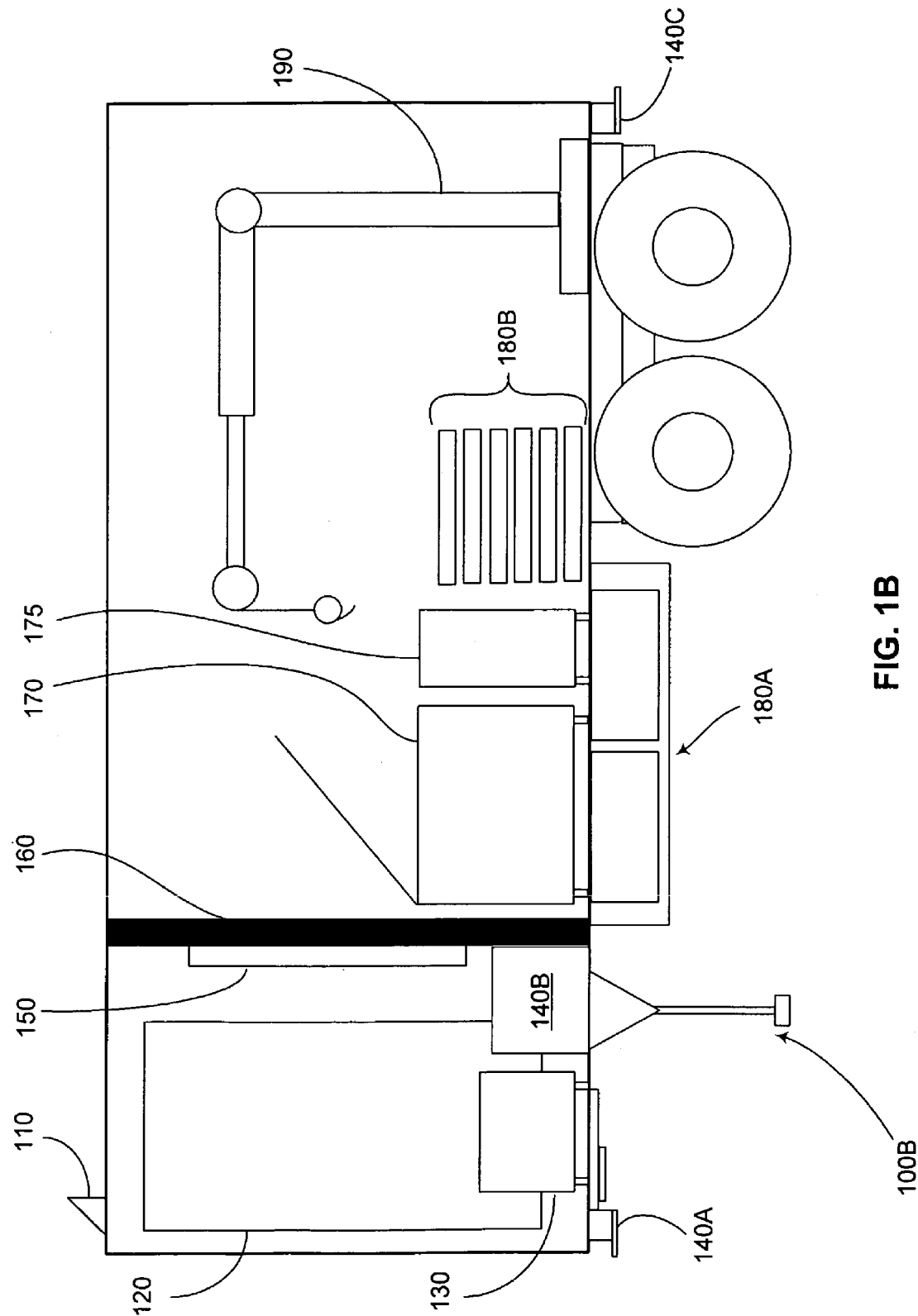
FIG. 1B depicts a cross-sectional view of a mobile unit for cryogenic treatment according to various embodiments.

FIG. 1B depicts a cross-sectional view of an exemplary mobile unit 100B for cryogenic treatment. The mobile unit 100B is substantially similar to the mobile unit 100A with the addition of an oven 175. The oven 175 is configured to temper treatable objects after cryogenic treatment. After an object is cryogenically treated in the cryogenic treatment chamber 170, the object may be conveyed into the oven 175 by the telescopic crane 190. The object, after being tempered, may be temporarily stored on storage racks 180A or 180B.

Figure 2:
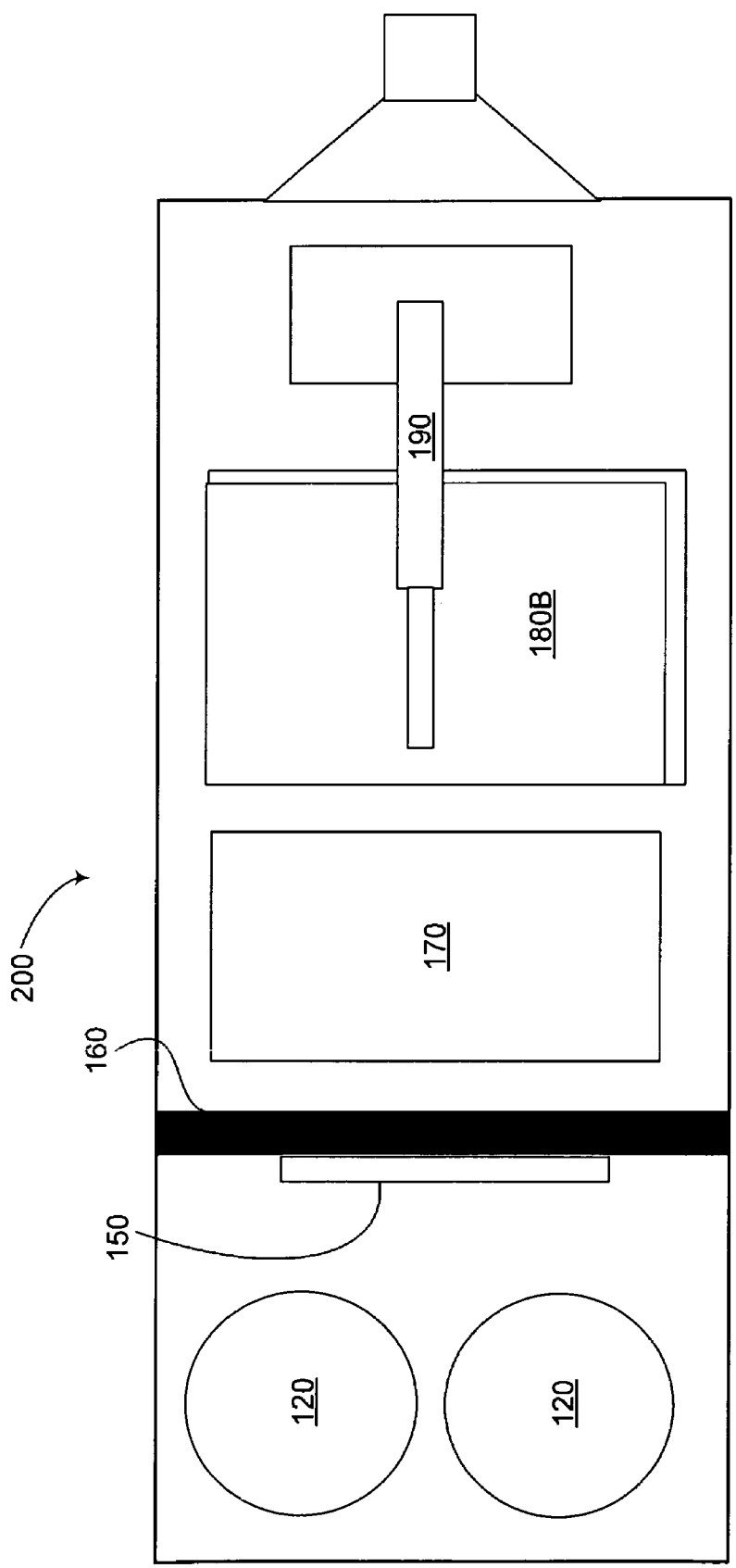
FIG. 2 depicts a top view of a mobile unit for cryogenic treatment according to various embodiments.

FIG. 2 depicts a top view of a mobile unit 200 for cryogenic treatment according to various embodiments. The mobile unit 200 includes two cryogenic liquid sources 120, the control panel 150, the barrier 160, the cryogenic treatment chamber 170, the storage rack 180B, and the telescopic crane 190. The mobile unit 200 may be a tractor-trailer or a fifth wheel tractor-trailer. In the mobile unit 200, the cryogenic liquid sources 120 are positioned over or nearly over an axle for improved weight distribution. The cryogenic liquid sources 120 may be transported within the mobile unit 200, eliminating the need for the cryogenic liquid sources 120 to be replaced at each new location.

Figure 3:
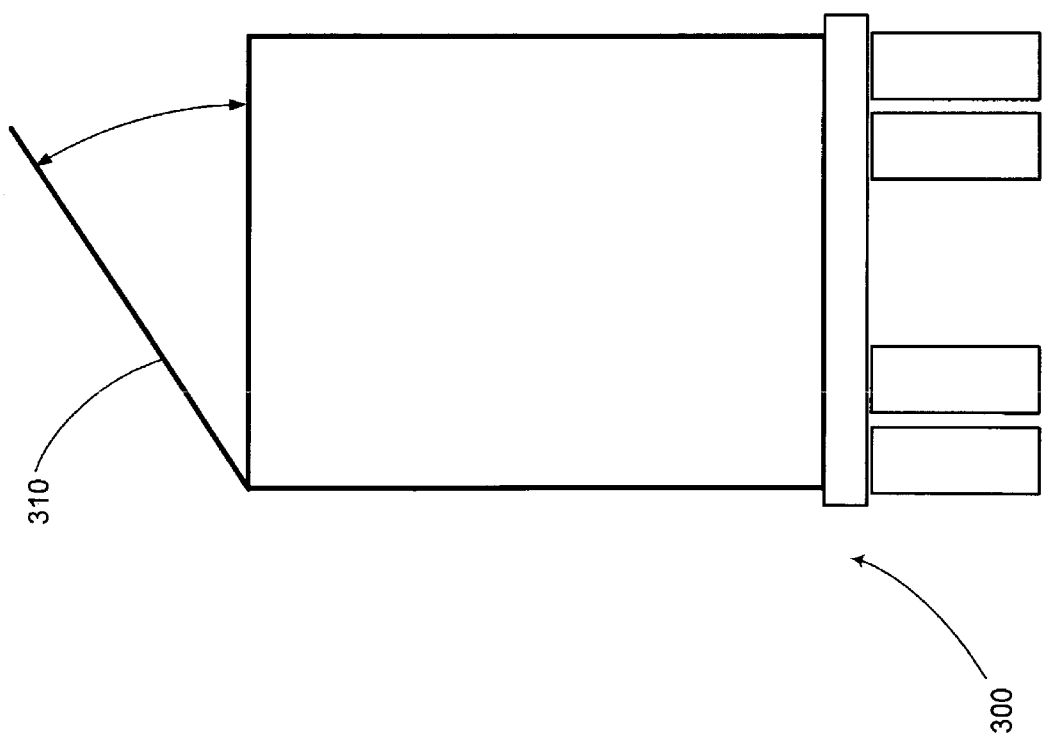
FIG. 3 depicts a rear view of a mobile unit for cryogenic treatment according to various embodiments.

FIG. 3 depicts a rear view of a mobile unit 300 according to various embodiments. In an embodiment of the portable cryogenic treatment system, the mobile unit 300 includes a convertible ceiling 310. The convertible ceiling 310 may be used as a replacement for, or in addition to, ventilation 110. As depicted, the convertible ceiling 310 may be mounted on the mobile unit 300 to swing upwards while remaining attached along a side wall, a front wall, or a rear wall of the mobile unit 300. The convertible ceiling 310 may comprise the entire ceiling or a portion thereof. In other embodiments, the convertible ceiling 310 may be capable of being rolled to one wall of the mobile unit 300, folded, or otherwise removable as will be apparent to those skilled in the art.

Figure 4:
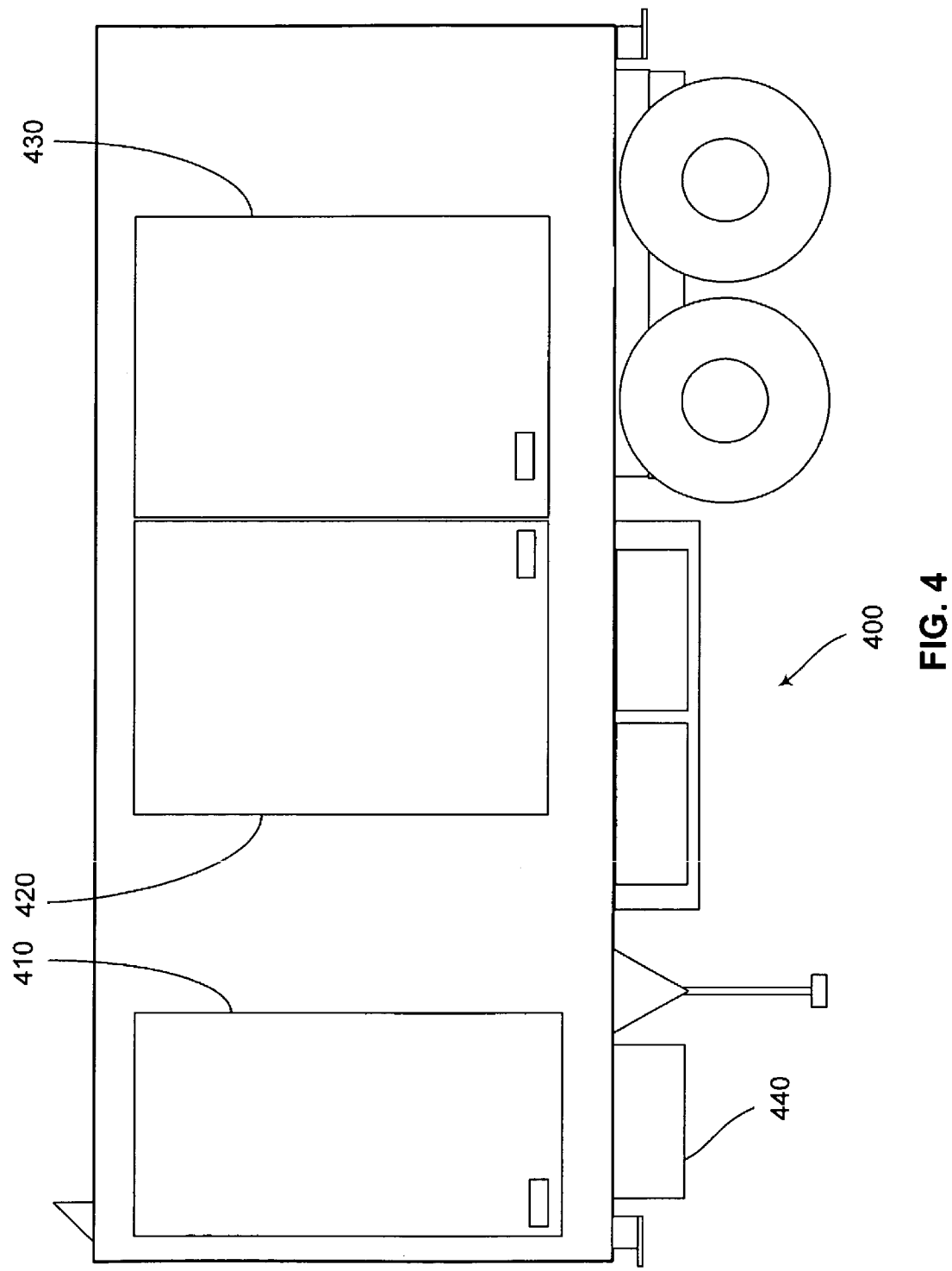
FIG. 4 depicts a side view of a mobile unit for cryogenic treatment according to various embodiments.

FIG. 4 depicts a side view of a mobile unit 400 for cryogenic treatment according to various embodiments. The mobile unit 400 includes a cryogenic liquid source door 410, a cryogenic treatment chamber door 420, a storage rack door 430, and an auxiliary fuel tank 440. The mobile unit 400, or portions thereof, may be rendered inaccessible to unauthorized persons by locking or otherwise securing the cryogenic liquid source door 410, the cryogenic treatment chamber door 420, and/or the storage rack door 430. As depicted, the cryogenic treatment chamber door 420 is contiguous with the storage rack door 430. As will be apparent to one skilled in the art, the doors may be placed and/or sized as needed depending on the internal organization of the mobile unit 400.

Figure 5:
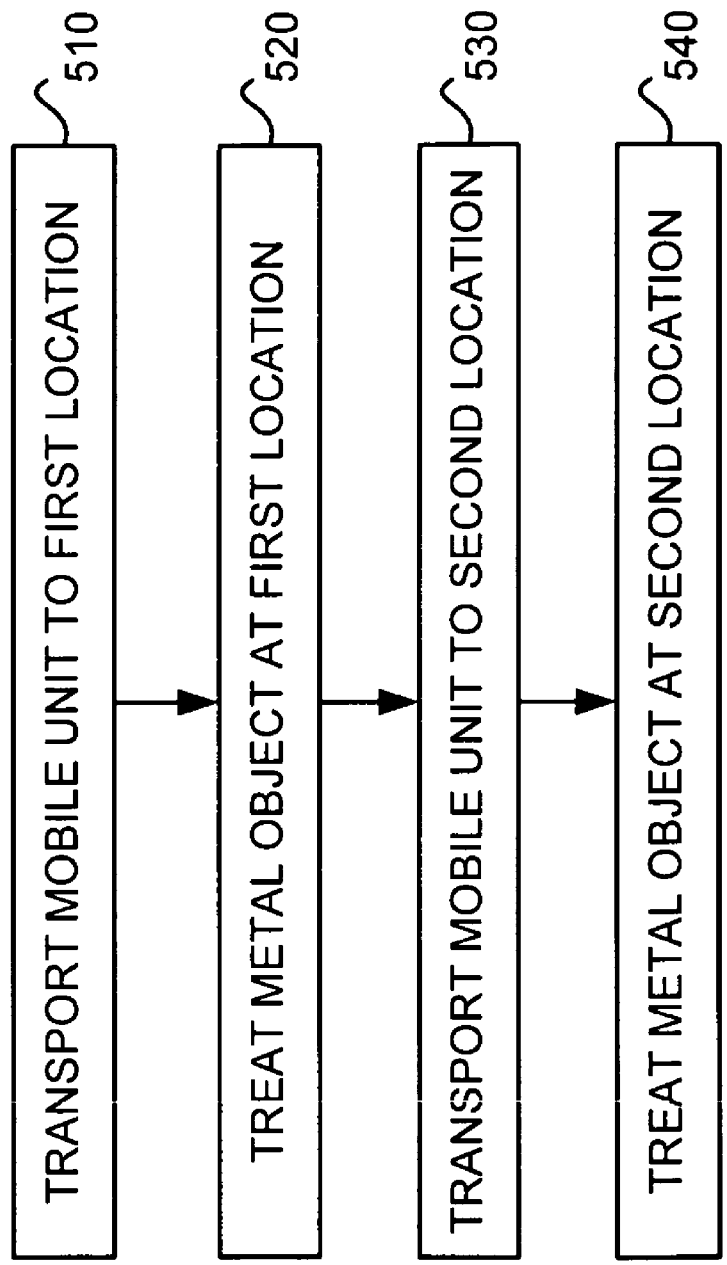
FIG. 5 is a flowchart of a method for cryogenically treating objects at various locations according to various embodiments.

FIG. 5 is a flowchart of a method 500 for cryogenically treating treatable objects at various locations. The method 500 may be performed using the mobile units 100A, 100B, 200, 300, and/or 400 all of which are exemplary embodiments of a mobile cryogenic unit.

In a step 510, a mobile cryogenic unit is transported to a first location. The transportation may be performed by a tractor, a truck, a locomotive, or the like as will be apparent to those skilled in the art. The mobile cryogenic unit may be detached from the transporting means at the first location.

At the first location, cryogenic liquid may be delivered to the mobile cryogenic unit. The delivery may include refilling a fixed cryogenic liquid source, installing a tank containing cryogenic liquid in the mobile cryogenic unit, or connecting an inlet of the cryogenic treatment chamber to a cryogenic liquid source disposed external to the transportable housing.

In a step 520, a first treatable object is treated in the cryogenic treatment chamber using the cryogenic liquid at the first location. The first treatable object may additionally be tempered using an oven or a heating element integrated into the cryogenic treatment chamber.

In some embodiments, cryogenic liquid leftover from treating the first treatable object may be vented at the first location. By venting any leftover cryogenic liquid, costs associated with transporting the cryogenic liquid such as transportation, fuel, and licensing costs, may be avoided. In embodiments where a tank of cryogenic liquid is delivered to the first location, the tank may simply be removed from the mobile cryogenic unit.

In a step 530, the mobile cryogenic unit is transported to a second location. The transportation may be performed by a tractor, a truck, a locomotive, or the like as will be apparent to those skilled in the art. The mobile cryogenic unit may be detached from the transporting means at the second location. As described in connection with step 510, cryogenic liquid may be delivered to the mobile cryogenic unit at the second location. In some embodiments, at least a portion of the first delivery of the cryogenic liquid may also be transported to the second location.

In a step 540, a second treatable object is treated at the second location in the cryogenic treatment chamber with the cryogenic liquid. The second treatable object may additionally be tempered using an oven or a heating element integrated into the cryogenic treatment chamber.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A portable cryogenic treatment system comprising:
   a transportable housing comprising a plurality of side walls, a front wall, a rear wall, a ceiling and a floor, the transportable housing including
   a cryogenic liquid source,
   a cryogenic treatment chamber in fluid communication with the cryogenic liquid source, the cryogenic treatment chamber configured to treat a treatable object using a cryogenic liquid, and
   an oven configured to temper the treatable object.

2. The system of claim 1, wherein the cryogenic liquid source comprises a cryogenic liquid tank.

3. The system of claim 1, wherein the cryogenic liquid source comprises a cryogenic liquid generator.

4. The system of claim 1, wherein the transportable housing further includes a vent configured to release excess gas resulting from a phase change of the cryogenic liquid.

5. The system of claim 1, wherein the transportable housing further includes means for tempering the treatable object.

6. The system of claim 1, wherein the transportable housing comprises a trailer configured to be drawn by a motor vehicle.

7. The system of claim 6, wherein the trailer comprises at least one stabilizer.

8. The system of claim 1, wherein the transportable housing comprises a shipping container.

9. The system of claim 1, wherein the transportable housing comprises a straight truck.

10. The system of claim 1, further comprising a crane configured to place the treatable object into the cryogenic treatment chamber.

11. The system of claim 1, further comprising a control panel configured to regulate delivery of the cryogenic liquid to the cryogenic treatment chamber from the cryogenic liquid supply.

12. The system of claim 1, wherein the treatable object is made of a material selected from the group consisting of metal, alloy, ceramic, and plastic.

13. A portable cryogenic treatment system comprising:
    a transportable housing comprising a plurality of side walls, a front wall, a rear wall, a ceiling and a floor, the transportable housing including:
    a cryogenic liquid inlet configured to be connected to a cryogenic liquid source disposed external to the transportable housing,
    a cryogenic treatment chamber in fluid communication with the cryogenic liquid source, the cryogenic treatment chamber configured to treat a treatable object using a cryogenic liquid, and
    an oven configured to temper the treatable object.

14. A transportable housing comprising:
    means for treating a treatable object with a cryogenic liquid;
    means for conveying the treatable object to the means for treating the treatable object;
    means for tempering the treatable object; and
    means for transporting the means for treating the treatable object and the means for conveying the treatable object.

15. A method comprising:
    transporting a mobile cryogenic unit to a first location, the mobile cryogenic unit comprising a cryogenic treatment chamber;
    treating a first treatable object in the cryogenic treatment chamber with a cryogenic liquid at the first location;
    transporting the mobile cryogenic unit to a second location; and
    treating a second treatable object in the cryogenic treatment chamber with the cryogenic liquid at the second location.

16. The method of claim 15, further comprising:
    receiving a first delivery of the cryogenic liquid at the first location; and
    using at least a portion of the first delivery of the cryogenic liquid at the second location to treat the second treatable object.

17. The method of claim 15, further comprising:
    receiving a first delivery of the cryogenic liquid at the first location;
    venting an unused portion the first delivery of the cryogenic liquid at the first location; and
    receiving a second delivery of the cryogenic liquid at the second location.

18. The method of claim 15, wherein the cryogenic liquid comprises liquid nitrogen.

19. The method of claim 15, further comprising detaching the mobile cryogenic unit from a motor vehicle.

* * * * *